Nov. 15, 1966 G. F. MITCHELL 3,285,227
LINER FOR POULTRY WATERING TROUGH
Filed Oct. 12, 1965
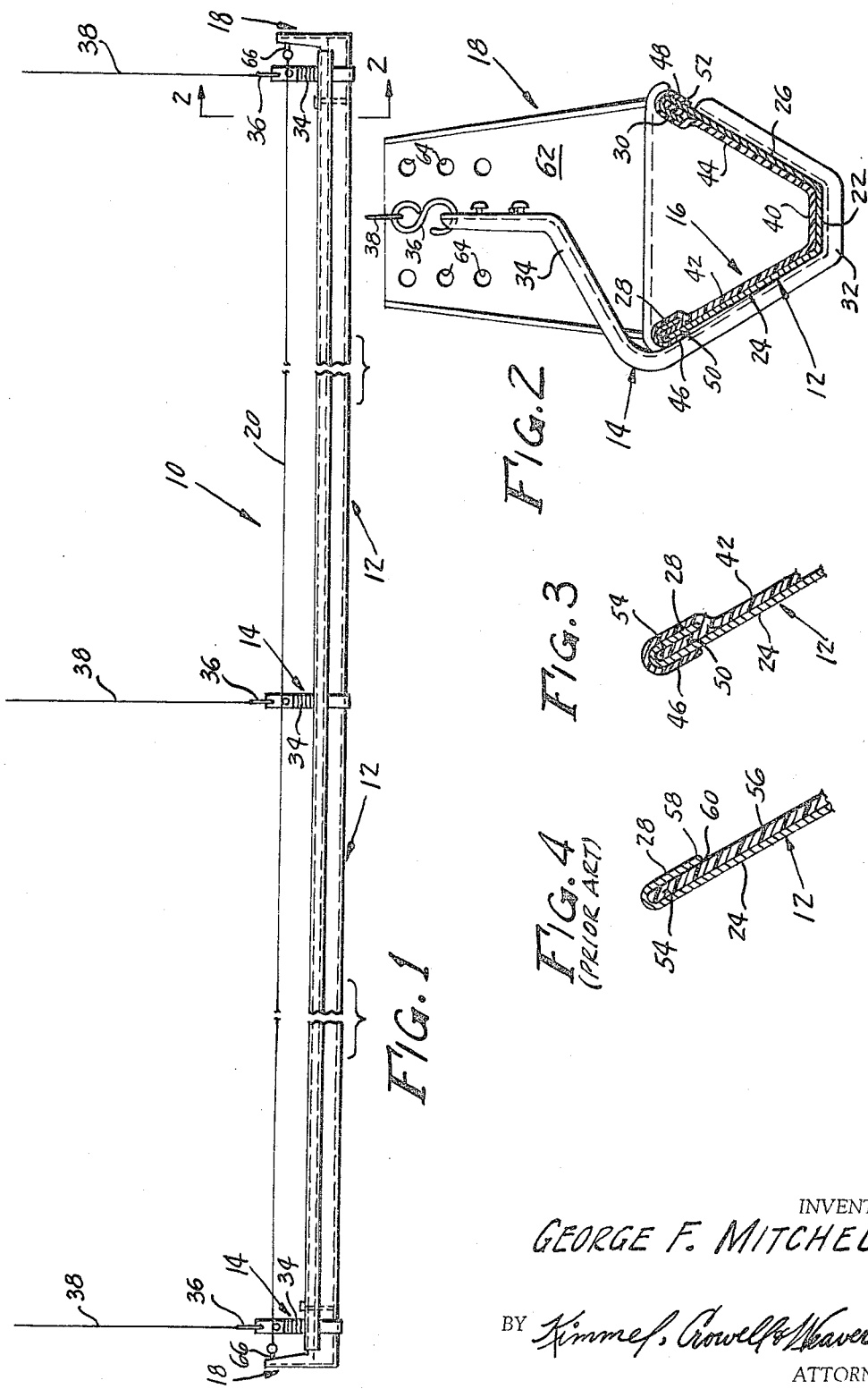
INVENTOR.
GEORGE F. MITCHELL
BY Kimmel, Crowell & Weaver
ATTORNEYS.

United States Patent Office 3,285,227
Patented Nov. 15, 1966

3,285,227
LINER FOR POULTRY WATERING TROUGH
George F. Mitchell, Sidney, Ohio, assignor to Everyday Manufacturing Company, Sidney, Ohio, a corporation of Ohio
Filed Oct. 12, 1965, Ser. No. 495,057
8 Claims. (Cl. 119—61)

This invention relates to a poultry watering trough and more particularly to a liner inserted in a pre-existing rigid watering trough which may be positioned in a chicken house longitudinally extending along a row of roosts, or cages, whereby the poultry may obtain fresh water at all times. One type of trough and liner is illustrated in United States Patent 3,150,638, illustrating a substantially V-shaped trough having inwardly reverted upper edges for receiving a replaceable liner.

It has been found that the poultry watering trough and liner illustrated in the aforementioned patent has several important disadvantages. In order to provide a clean and sanitary poultry raising area, it is necessary to provide a relatively sanitary watering trough for the prevention of disease and fouling of water or other liquids which the fowl must drink. It has been found that the liner and trough of the aforementioned patent cannot be satisfactorily cleaned because detritus tends to accumulate under the lower edge of the reverted ledge. Accordingly, the only manner by which the accumulated material may be removed is by vigorous scrubbing with a wire brush or the like which materially diminishes the life of the liner.

It is accordingly a primary object of the instant invention to provide a liner for poultry troughs which, when installed, presents a relatively smooth interior surface for easy cleaning.

Another object of the instant invention is to provide a liner for poultry troughs having an inwardly reverted upper edge in which the liner provides a means for surrounding at least a portion of the inwardly reverted upper ledge.

Still another object of the instant invention is to provide a liner for poultry troughs which is inexpensive to manufacture, easy to install, which is long lasting and which may readily be cleaned.

A further object of the instant invention is to provide a substantially V-shaped poultry trough having an upper inwardly reverted ledge and a liner at least partially surrounding the ledge.

A more specific object of the instant invention is to provide a liner for poultry troughs having an upper inwardly reverted edge in which the liner includes a portion extending under the ledge and another portion extending around and over the topmost portion of the trough.

A further object of the instant invention is to provide a liner for poultry watering troughs comprised of extruded or otherwise manufactured plastic of any desired length, a material being flexible so that it may be rolled for shipment or storage and so that it may be readily installed.

Still other objects and advantages of the instant invention, as well as the invention itself, reside in the arrangements of parts, and features of construction and operation, all as will be more fully pointed out hereinafter and disclosed in the accompanying drawing wherein there is shown a preferred embodiment of this inventive concept.

In the drawing:
FIGURE 1 is a side elevational view of a continuous sectional watering trough in which is installed a liner according to the principles of the instant invention;
FIGURE 2 is a transverse cross-sectional view of the watering trough of FIGURE 1 taken substantially along line 2—2 thereof viewing in the direction of the arrows;
FIGURE 3 is an enlarged view of one leg of the watering trough of FIGURE 2; and
FIGURE 4 is a view similar to that of FIGURE 3 showing the prior art construction.

Referring now to the drawing in detail, wherein like reference characters designate like elements throughout the several views thereof, there is indicated generally at 10 a watering trough including a plurality of substantially V-shaped trough sections indicated generally at 12 supported in a substantially horizontal attitude by a plurality of hangers indicated generally at 14. A continuous trough liner denominated generally at 16 extends throughout the length of trough 10 and provides a protective covering for trough section 12. The ends of trough 10 may be closed in any suitable manner to provide a body of water or other liquid within liner 16 such that fowl may partake thereof. An upstanding brace indicated generally at 18 is affixed at each end of trough 12 and provides a connection for a suitable anti-roosting device 20.

Trough section 12 is illustrated as including a substantially horizontal bottom wall 22 and a pair of upwardly diverging side walls 24, 26, although it is to be understood that the configuration of trough section 12 may be of any conventional type. The upper end of trough section 12 includes an inwardly reverted edge 28, 30 forming a groove between side walls 24, 26 and upper edges 28, 30 in which a liner resides as more fully explained hereinafter. It should be understood that trough section 12 may be made of any suitable material, such as metal, plastic, wood, wire or the like.

Hanger 14 includes a trough receiving section 32 complementarily shaped to receive and horizontally support trough 12. Hanger 14 also includes an arcuate bracket 34, having a substantially vertical section receiving an S-shaped hook 36 connected to a supporting wire or rope 38.

Liner 16 is made of a flexible or foldable water impermeable material, such as plastic, one example being polyvinyl chloride. Liner 16 is preferably made in continuous lengths, as by extrusion or any other convenient process providing a liner which may be rolled for shipment or storage. Since liner 16 is water impermeable, it is unnecessary to connect trough sections 12 in fluid tight relation. Liner 16 includes an elongate continuous main body portion deformed to provide a base 40 and a pair of upwardly divergent side walls 42, 44 juxtaposed to walls 22, 24, 26 of trough section 12. Each of side walls 42, 44 carries at the outer extremity thereof a reverted end portion 46, 48 and an offset flange 50, 52 extending from a point on the outer surface of side walls 42, 44 upwardly and generally toward the apex of reverted end portions 46, 48. As may be seen most clearly in FIGURE 3, offset flange 50 preferably lies between reverted end portion 46 and side wall 42.

In the installation of liner 16 in trough section 12, it is necessary only to fold back reverted end portions 46, 48 such that offset flanges 50, 52 may be positioned in a groove 54 formed between reverted edges 28, 30 and side walls 24, 26 of trough section 12. Reverted end portion 46, 48 of liner 16 will then be folded around the apex of reverted edge 28, 30 thereby surrounding the upper edge of trough section 12. It will be seen that the installation of liner 16 in trough section 12 provides a trough section having an interior surface completely covered by liner 16.

Referring now to FIGURE 4, a cross-sectional view of trough section 12 is shown providing a side edge 24, an upper reverted edge 28 and a groove 54 formed there-between. The liners of the prior art include a divergent wall 56 juxtaposed to side wall 24 and received in groove 54. Since liners are made of a slick water impervious material, they are readily cleaned whereas metal trough section 12 may be substantially rusted or corroded providing a pitted surface on reverted edge 28 which is difficult to clean. In addition, the extreme end 58 of reverted edge 28 and wall 56 of the prior art liner form a crevice 60 into which foreign material accumulates.

In order to clean the poultry liners of the prior art, it is necessary to take a brush or the like and attempt to dislodge accumulated material from crevice 60. It is apparent that this is an unduly time-consuming, expensive, arduous and unpleasant task which is usually imperfectly done, thus resulting in an unclean and unsanitary poultry trough. In addition, the utilization of a wire brush or the like on plastic liners materially decreases the longevity thereof.

As an additional feature, a brace 18 may be provided at each end of trough 10, or intermediate the ends thereof, for securing anti-roosting means 20 to trough sections 12. Brace 18 includes a planar plate 62 affixed to trough sections 12, forming a plurality of apertures 64 in one of which resides a wire attachment means or eye bolt 66 to which may be attached anti-roosting means 20. Anti-roosting means may be of any suitable type but is illustrated as including a wire disposed along the center line of trough 10 and which may be electrified, if desired. Obviously, any other type of anti-roosting means may be employed, and in the event that trough 10 is being utilized with caged birds, the anti-roosting device is unnecessary.

It is now seen that there is herein provided an improved liner for watering troughs particularly adapted for poultry, which accomplishes all of the objects of this invention and others, including many advantages of great practical utility and commercial importance.

It will also be seen that while the hereinabove described arrangement is particularly applicable to a water trough for poultry, it may be equally well applied to other types of troughs for containing liquids.

As many embodiments may be made of the instant inventive concept, and since many modifications may be made in the embodiment hereinbefore shown and described, it is to be understood that the foregoing is to be interpreted merely as illustrative and not in a limiting sense.

I claim:

1. A trough liner comprised of a water impervious flexible semi-rigid material having an arcuate cross-sectional configuration including a pair of side walls adapted to conform to the configuration of the trough, an outwardly reverted end portion at the extremity of each divergent wall adapted to overlie the adjacent trough edge and an offset flange extending from a point below the apex of said reverted end portion and on the outer side of each side wall and upwardly generally toward the apex of the reverted end portion and the top of the adjacent side wall and adapted to extend between the edge of the trough and an inwardly extending reverted flange thereon.

2. The structure of claim 1 wherein said cross-sectional configuration provides a base and a pair of divergent side walls.

3. The structure of claim 1 wherein said offset flange extends between the extremity of said reverted end portion and the top of the adjacent side walls.

4. The structure of claim 1 including a poultry trough having an arcuate cross-sectional configuration having a pair of side walls, each of said side walls forming an inwardly reverted edge providing a groove between said reverted edge and said side wall, said offset flange of said liner being received by said groove, said reverted end of said liner surrounding said trough reverted edge, said liner side walls being juxtaposed to said trough side wall.

5. An elongate strip of deformable water impermeable material adapted to be utilized as a liner for a watering trough comprising an elongate main body portion adapted to be conformed to the inner walls of a poultry trough and having a pair of lateral edges each of said lateral edges, having an outwardly reverted end portion adapted to overlie the adjacent trough edge and an offset flange extending from a point on the outer side of said main body portion toward the apex of said reverted end portion and adapted to extend between the edge of the trough and an inwardly extending reverted flange thereon.

6. The structure of claim 5 wherein said strip is rolled for shipment.

7. The structure of claim 5 wherein said main body portion is deformed into a substantially V-shaped configuration having a base and a pair of divergent side walls.

8. The structure of claim 7 including a poultry trough having a substantially V-shaped cross-sectional configuration having a base and a pair of divergent side walls, each of said side walls forming an inwardly reverted edge providing a groove between said reverted edge and said side wall, said offset flange of said liner being received by said groove, said reverted end of said liner surrounding said trough reverted edge, said liner side walls being juxtaposed to said trough side walls, said liner base being juxtaposed to said trough base.

References Cited by the Examiner

UNITED STATES PATENTS

| | | | |
|---|---|---|---|
| 2,452,237 | 10/1948 | Hoburg et al. | 119—72 |
| 2,789,537 | 4/1957 | Bailey | 119—61 |

SAMUEL KOREN, *Primary Examiner.*

HUGH R. CHAMBLEE, *Examiner.*